No. 784,627. PATENTED MAR. 14, 1905.
L. H. McCORMAC.
CORN PLANTER.
APPLICATION FILED JUNE 29, 1903.
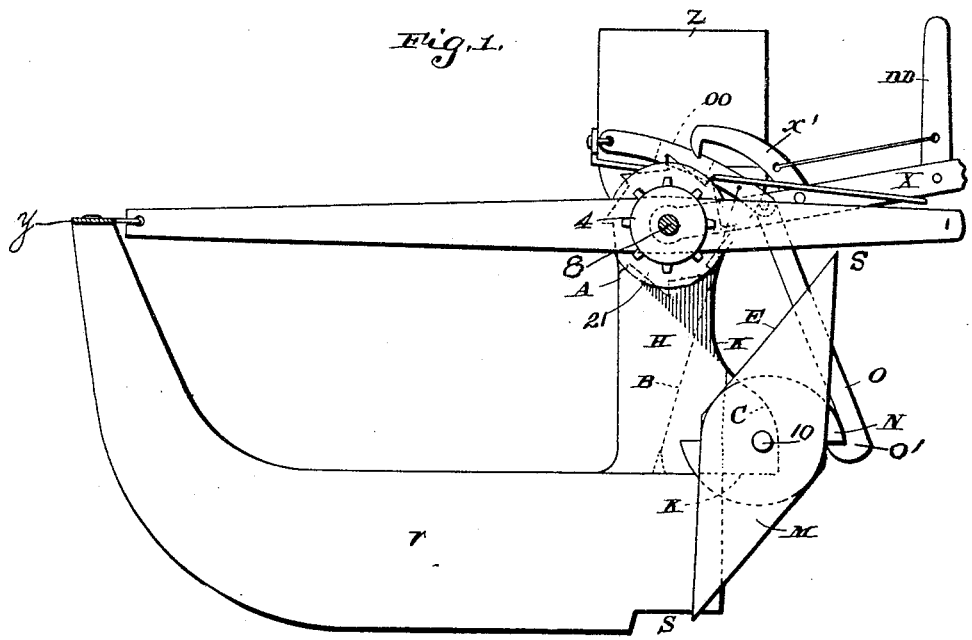
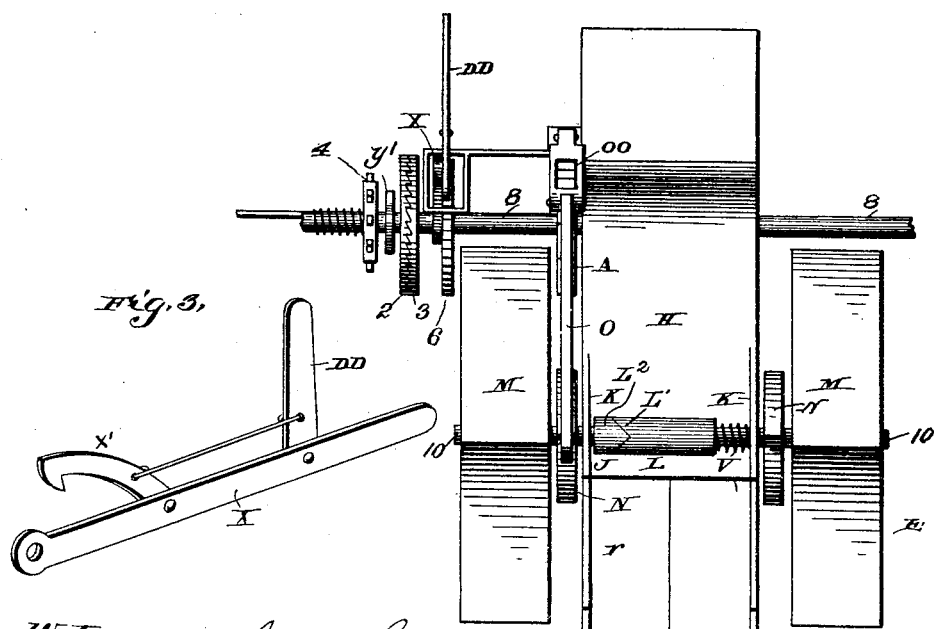
Witnesses:
James F. Crawford
John W. Stuart
Inventor:
L. H. McCormac No. 784,627.

Patented March 14, 1905.

UNITED STATES PATENT OFFICE.

LAFAYETTE H. McCORMAC, OF MALLARD, ILLINOIS.

CORN-PLANTER.

SPECIFICATION forming part of Letters Patent No. 784,627, dated March 14, 1905.

Application filed June 29, 1903. Serial No. 163,563.

*To all whom it may concern:*

Be it known that I, LAFAYETTE H. McCORMAC, a citizen of the United States, residing at Mallard, in the county of Hancock and State of Illinois, have invented a new and useful Improvement in Corn-Planters, of which the following is a specification.

My invention relates to improvements in corn-planters, and more particularly to the markers for corn-planters.

It has for its object to dispense with the check-row wires which are used to give perfect alinement to the hills of corn and to provide a marker attachment to the planter whereby as each hill is dropped a mark is made and the driver may readily aline his rows.

I have illustrated the preferred embodiment of my invention in the accompanying drawings, in which—

Figure 1 is a side elevation of a part of the corn-planter, showing the runner or furrow-opener and dropping-chute and the marker attachment. Fig. 2 is a rear view of the same, and Fig. 3 is a detail of the lever.

The construction which I have worked out as the most practical form of my invention provides for a runner-frame $r$, located immediately in front of the covering-wheels of the machine on each side of the frame and secured at its front end to the cross-bar $y$ of the frame. Extending from the hopper $z$, mounted upon the frame, downwardly to the rear end of the runner is a chute H, through which the corn is adapted to pass from the hopper to the ground. Carried by said chute and formed integrally therewith are castings $k$ $k$, extending rearwardly from said chute to form bearing-supports for the shaft 10. The shaft 10 carries on each side of the chute a marker M, preferably of the form shown in the drawings, having two opposite ends $s$ pointed or tapered to form a point which will easily enter the ground a short distance, forming a mark therein. It is apparent that any other form of marker may be used, and I do not wish to limit myself to this particular construction. The pointed ends of the marker engage the ground at required intervals as the corn is dropped from the hopper, thereby marking each hill.

The shaft 10, carrying the marker M is rotated partially by engagement with the ground and partially by a lever O, having a projection O', which engages the ratchet-teeth of a ratchet-wheel N, also mounted upon the shaft 10 and adapted to rotate therewith. The lever O extends upwardly and at its upper end is pivotally connected with a lever O O, which in turn is pivotally connected to the hopper $z$.

An operating-rod 8 of the usual construction passes through the hopper $z$ and operates the apparatus therein to drop the corn in the usual manner and is driven by a sprocket-chain (not shown) passing around the sprocket-wheel 4, carried by said operating-rod. Said rod also carries the usual clutch comprising the members 2 and 3 for stopping and starting the dropping mechanism, and the members 2 and 3 are thrown into and out of engagement by the lever $y'$. A wheel A, having peripheral teeth, is carried by said operating-rod and adapted to rotate therewith, the teeth of said wheel engaging the under side of the lever O O and raising and lowering the same as the wheel is rotated thereby through the lever O, moving the marker M around into a position to engage the ground.

For manually throwing the marker into operative position in the event when the machine is started the point is not in position to engage the ground and be rotated as the machine is moved I provide a lever X for rotating the operating-rod and through said rod the wheel A, levers O O and O, and the marker M. The lever X is loosely mounted at one end upon the operating-rod 8 and is provided with a catch X', adapted to engage the teeth of the ratchet-wheel 6, also carried upon the operating-rod, and as the lever is moved down cause the wheel 6 to rotate, thereby rotating the operating-rod. A handle D D is mounted upon the lever and is connected by a rod to the catch X' to throw the same into and out of operative relation with the ratchet-wheel.

To aid in turning the marker after it has reached a point when it will be no longer turned by engagement with the ground, upon the shaft 10 a sleeve L is splined, which is provided at one end with a V-shaped notch L', adapted to be engaged by a wedge-shaped portion $L^2$ of the member J, which is secured to the inner side of one of the castings K. A coiled spring V at the opposite end of the sleeve bears against the same and by its force presses the sleeve into engagement with the portion J. As the marker M is rotated the sleeve L turns with the shaft 10 and is moved away from the portion J by the particular construction of the wedge and notch, and when the outer point of the notch passes the point of the wedge the spring pressing same together will cause the marker to snap around until the sleeve has reached its natural position with relation to the portion J.

In operation it will be seen, the parts being in position shown in the drawings, as the planter is moved forward the operating-rod 8 will be rotated by the sprocket-wheel and chain, (not shown,) causing the corn to drop from the hopper $z$ through the chute H to the ground. At the same time one of the peripheral teeth of the wheel A will engage the cross-lever O O, raising the same a short distance, which in turn raises the lever O and gives the ratchet-wheel N a sufficient movement to turn the marker M far enough for the point to engage the ground. As the planter continues to advance the marker is rotated, at the same time making an impression in the ground. The marker continues to rotate by engagement with the ground until the outer end of the V-shaped slot in the sleeve L has passed the point of the wedge of the portion J, when it will be far enough to be able to be snapped around by the sleeve L and the member J to a position where its next point will be ready to be moved into engagement with the ground.

While I have described the marker as being partially rotated by engagement with the ground, it will be understood that I not wish to limit myself to this construction, as by enlarging the teeth of the wheel A and increasing the number of teeth on the wheel N the marker will be operated by the movement of the operating-rod alone. Also it is not necessary that I should provide the stationary member J and the movable member L in order that the device may be made operative.

Having thus described my invention, what I claim as new, and desire to secure by Letters Patent, is—

1. In a corn-dropper, the combination with a dropping mechanism, of a marker adapted to be operated by engagement with the ground, and means to cause said marker to engage the ground at regular intervals.

2. In a corn-dropper, the combination with a dropping mechanism, of a marker adapted to be operated by engagement with the ground, and means operated by the dropping mechanism to cause said marker to engage the ground at regular intervals.

3. In a corn-dropper, the combination with a dropping mechanism, of a marker adapted to engage the ground at regular intervals, and be operated thereby, a wheel carried by the operating-shaft, and means operated by said wheel to cause the marker to engage the ground.

4. In a corn-dropper, the combination with a dropping mechanism, of a marker adapted to engage the ground at regular intervals, and be operated thereby, a cam-wheel mounted to rotate with said marker, and means operated by the dropping mechanism to rotate the wheel and cause said wheel to engage the ground at regular intervals.

5. In a corn-dropper, the combination with a dropping mechanism, of a marker adapted to engage the ground at regular intervals, and be operated thereby, means for causing said marker to engage the ground at regular intervals, and means for moving said marker into operative position.

6. In a corn-dropper, the combination with a dropping mechanism, of a marker adapted to engage the ground at regular intervals, and be operated thereby, means operated by the dropping mechanism to cause said marker to engage the ground, and means for moving said marker to its initial position in starting.

7. In a corn-dropper, the combination with a dropper mechanism, of a marker adapted to engage the ground at regular intervals, and be operated thereby, means operated by the dropping mechanism to cause said marker to engage the ground, a ratchet-wheel carried by the operating-shaft, and a lever mounted on said shaft adapted to rotate said wheel and operate said operating means to move the marker to its initial position in starting.

8. In a corn-dropper, the combination with a dropper mechanism, of a marker adapted to engage the ground at regular intervals, and be operated thereby, means operated by dropping mechanism to cause said marker to engage the ground, and means to rotate said marker between the intervals of its engagement with the ground.

9. In a corn-dropper, the combination with a dropping mechanism, of a marker adapted to engage the ground at regular intervals, and be operated thereby, means operated by the dropping mechanism to cause said marker to engage the ground, a stationary member, and a movable member carried by the shaft of the marker, adapted to coact with said stationary member to rotate said marker between the intervals of its engagement with the ground.

L. H. McCORMAC.

Witnesses:
GEO. G. PERRIN,
WM. T. CRAWFORD.